United States Patent
Kasiviswanathan et al.

(10) Patent No.: US 7,761,375 B2
(45) Date of Patent: Jul. 20, 2010

(54) TRANSACTION SWITCH AND A METHOD FOR USE THEREOF

(75) Inventors: Ramanathan Kasiviswanathan, Kerala (IN); Sudheer Sadananda Kurkundhi, Karnataka (IN); Srinivasan Ramaswamy, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 1901 days.

(21) Appl. No.: 10/802,163

(22) Filed: Mar. 16, 2004

(65) Prior Publication Data

US 2005/0209957 A1    Sep. 22, 2005

(51) Int. Cl.
*G06Q 40/00* (2006.01)
(52) U.S. Cl. .......................................... 705/39; 705/21
(58) Field of Classification Search .................. 705/17, 705/18, 21, 24, 220, 39, 16
See application file for complete search history.

(56) References Cited

U.S. PATENT DOCUMENTS

| | | | | |
|---|---|---|---|---|
| 5,678,010 A | * | 10/1997 | Pittenger et al. | ............... 705/44 |
| 7,219,149 B2 | * | 5/2007 | Ofir et al. | ................... 709/224 |

* cited by examiner

*Primary Examiner*—Ojo O Oyebisi

(57) ABSTRACT

An aspect of the present invention provides a method of handling a financial transaction in a transaction switch. The method includes receiving a primary transaction request from an initiator, identifying a host from a routing table for receiving the primary transaction request based on details provided in the primary transaction request, transmitting the primary transaction request to the identified host, receiving a response from the identified host, determining a need for transmitting the primary transaction request to another host and interpreting the response received and transmitting a final outcome back to the initiator.

14 Claims, 4 Drawing Sheets

TRANSACTION SWITCH AND A METHOD FOR USE THEREOF

BACKGROUND OF THE INVENTION

1. Field of the Invention

The present invention relates generally to electronic transactions and more particularly to a transaction switch and a method of use thereof.

2. Description of Background Information

In a world where electronic financial transactions have become a norm, several different payment options have become available for consumers, namely, credit cards, debit cards, private label cards, pre-paid cards, loyalty cards and affinity cards, to name a few. At the same time, there are various organizations such as Visa, MasterCard and Discover that license different institutions to issue cards with their brand names. Due to the proliferation of institutions issuing cards and merchants accepting payment by these cards, a third party or an acquirer, as it is commonly referred to in the payment service industry, acting as an intermediary between merchants and various institutions representing the different card issuers is typically needed as a clearing house and for handling the various payment options.

An acquirer relies on a transaction switch to route transactions received from merchants. The operation of a typical switch is described with reference to FIG. 1. A merchant initiates a payment transaction, which is routed to an appropriate financial institution for approval. The response from the financial institution is conveyed to the merchant via the switch. However, conventional switches suffer from two primary limitations. First, conventional switches do not support composite transactions. Second, conventional switches require code changes in order to specify new rules for a transaction and to add new payment types. The result of both of these limitations is a delay in processing the transaction.

SUMMARY OF THE INVENTION

An aspect of the present invention provides a method of handling a financial transaction in a transaction switch. The method includes receiving a primary transaction request from an initiator, identifying a host from a routing table for receiving the primary transaction request based on details provided in the primary transaction request, transmitting the primary transaction request to the identified host, receiving a response from the identified host, determining a need for transmitting the primary transaction request to another host and interpreting the response received and transmitting a final outcome back to the initiator.

DETAILED DESCRIPTION

A transaction switch routes transaction data to financial institutions or hosts and merchants for processing and approving electronic transactions. The transaction switch according to the present invention receives transactions, preferably in an extensible markup language (XML) message format. XML format is preferred due to the universal acceptability and open nature of the language format, thereby significantly reduces the need for customization of various message formats. A Document Type Definition (DTD) is provided to define rules for allowing developers to convert non-XML message format to an XML packet. The DTD sets out the elements and structures for use in a particular type of XML document and the relationship between different elements in the document, to ensure consistency and conformity of documents of the same type. If the transaction message format is in non-XML, the acquirer is also provided with definitions to map various message formats to switch understandable XML message format and vice-versa.

The switch may also be utilized in conjunction with a distributed computing environment where tasks are performed by remote processing devices that are linked through a communications network. In a distributed computing environment, program modules may be located in both local and remote memory storage devices. Execution of the program modules may occur locally in a stand-alone manner or remotely in a client/server manner. Examples of such distributed computing environments include local area networks of an office, enterprise-wide computer networks, and the Internet. Additionally, the networks could communicate via wireless means or any of a variety of communication means.

Figure 1:
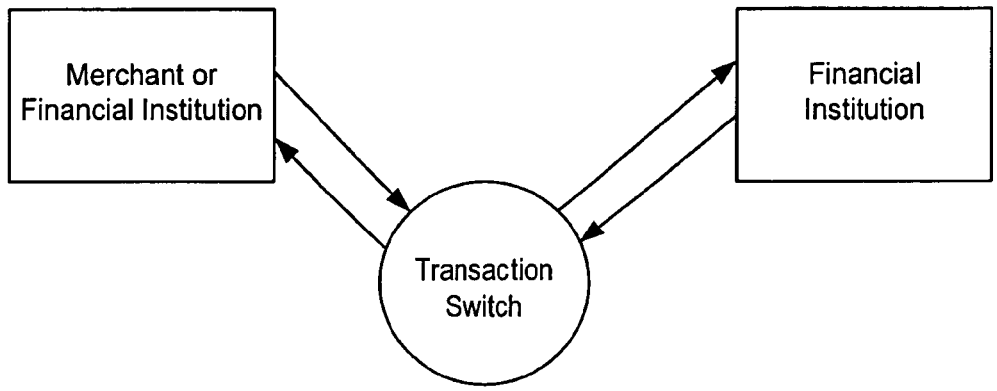
FIG. 1 is a functional block diagram of a prior art transaction switch.
Figure 2:
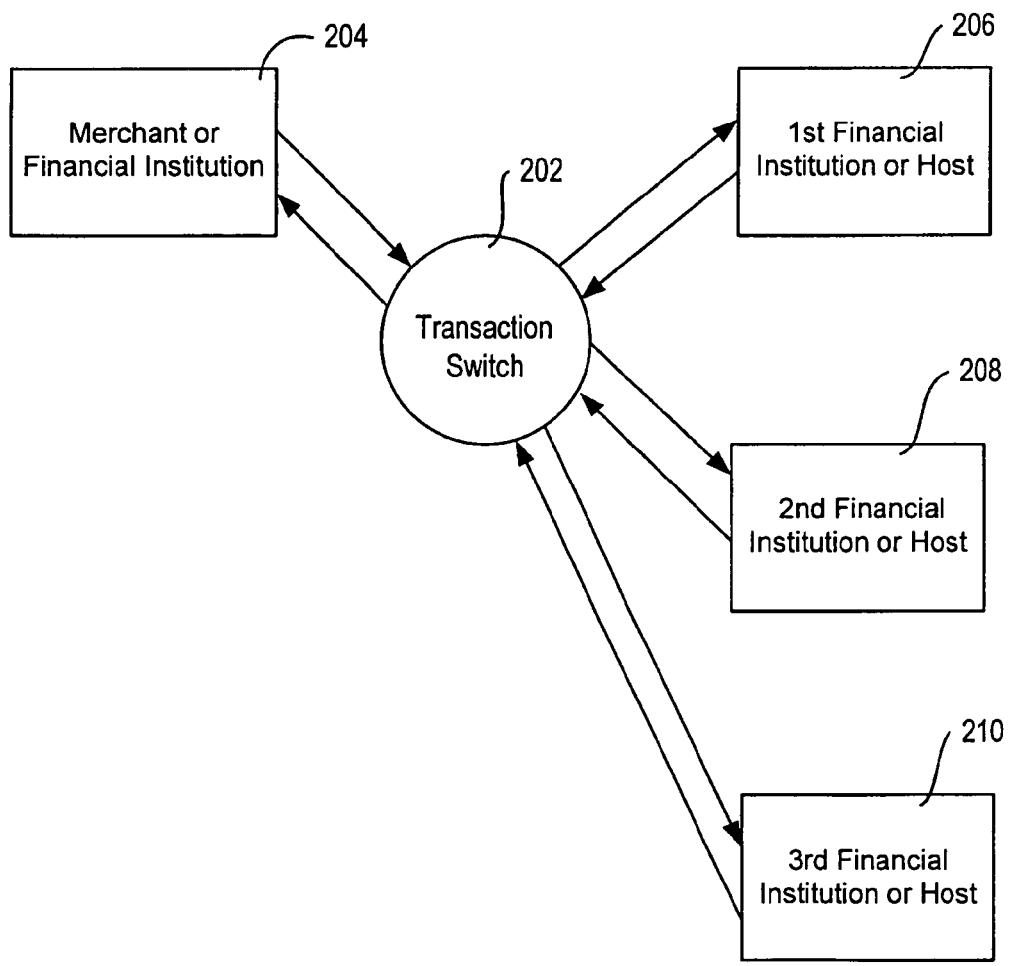
FIG. 2 is a functional block diagram of a transaction switch in accordance with an embodiment of the present invention.

FIG. 2 describes a transaction exchanges among merchant and financial institutions according to the present invention. With reference to FIG. 2, the flow sequence of a typical transaction is described as follows. A merchant 204 sends a transaction request in XML format to a transaction switch 202 with an acquirer. The switch 202 includes a receiving module (not shown) for receiving the transaction request and identifying the payment type from one of the following: credit, debit, private label, loyalty card, check and pre-paid card. XML fields that define the switching criterion are also identified. The XML fields also indicate a particular financial institution or host for processing the transaction of a particular payment and transaction type. Using this information, the transaction switch establishes contact with that particular host. The switch 202 also includes a differentiator module (not shown) for determining whether the transaction is a composite or a multi-host enabled transaction or both and preparing transaction packets for transferring to respective hosts. For a composite transaction, the switch 202 prepares multiple transaction packets for transmitting to respective hosts for processing. For a multi-host transaction, the switch 202 handles asynchronous transmission of transaction requests to different hosts and receiving responses from the hosts.

Thereafter, the first host 206 receives the transaction packet from the switch 202 for processing the transaction. The switch 202 further includes an analyzing module (not shown). The outcome of processing by the first host 206 is transmitted back to the analyzing module of the switch 202 as a response code. Based on the response code, payment type and transaction type, the analyzing module of the switch 202 determines whether the transaction should be sent to a second host 208 for processing. Transaction type includes sale, refund, void sale, reversal and offline sale.

If the switch 202 determines that the transaction request should be sent to a second host 208, the switch 202 identifies the payment and transaction type and the second host 208. The switch 202 modifies the transaction packet before transmitting to the second host 208. However, if the response code does not match criteria to transmit the transaction to a second host 208 for processing, the transaction is deemed complete and the response code is transmitted back to the merchant.

In the former case where the transaction is transmitted to the second host 208, the transaction is first recorded in a transaction log. When the transaction is processed by the second host 208, a second response code is generated and transmitted to the switch 202. The second response code is again evaluated whether the transaction needs to be transmitted to a third host 210 for processing. The steps of evaluating the need for transmitting to another host for processing and transmitting to that institution for processing iterate until such a need for further processing ceases, indicating that processing of the transaction request is complete. Upon completion, the final response is transmitted to the switch 202, which then notifies the merchant 204 the outcome of the transaction request.

In an embodiment, the switch 202 maintains a transaction log recording the transactions that are switched to and from financial institutions and merchants, and assigning a unique identifier to identify each switch transaction. Such a transaction log is required to perform secondary transactions and provide a transaction repository to generate reports. The unique identifiers enable tracking of transaction transmissions to various hosts for each transaction. A secondary transaction is a transaction that refers to an original or primary transaction, for example, a refund transaction which refers to a completed sales (primary) transaction is a secondary transaction.

In prior art switches, switching of transactions is generally achieved by Bank Identification Number (BIN) based switching or merchant-BIN based switching.

BIN is a unique number assigned by the financial institutions, such as Visa and MasterCard, to authorizing members, clearing members, and issuers for the purpose of identifying processing institutions in their network. The BIN forms a part of the card account number. For example, the first 6 digits of the 16-digit account number of a Visa card is the BIN. Switches can be configured to a range of BINs such as, 400000 to 499999 for VISA or 500000 to 599999 for MasterCard. Hence, when a switch 202 encounters a transaction with a BIN of 410000 the transaction is switched to the VISA host as configured. Since only two switching options are currently available, acquirers are constrained from specifying additional switching criterion.

According to another embodiment, an acquirer-defined criteria switch is provided to allow an acquirer to configure the switching criterion in order to achieve a more generic switching model. The acquirer configures the switching criterion by specifying XML DTD fields (also known as selectors) for new payment types, such as private label cards, to the DTD based on requirements from financial institutions. The acquirer also defines the combination of range of values of selectors for unique mapping to a host. An example of acquirer-defined criteria is illustrated as follows:

| Payment_type | CardBIN | MerchantID | Organization | Host |
|---|---|---|---|---|
| Credit | 876956 | 120000-129999 | MasterCard | WalmartMaster |
| Credit | 456321 | 120000-129999 | Visa | WalmartVisa |
| Credit | 456321 | — | Visa | HSBC-Visa |
| Credit | 876956 | — | MasterCard | HSBC-MasterCard |
| Credit | 452794 | — | Amex | Amex |
| Credit | 452794 | 120000-129999 | Amex | Walmart-Amex |

| Payment_type | Mobile Number | CardBIN | Host |
|---|---|---|---|
| Mobile | 9845000000-9845999999 | 876956 | Vodafone-MasterCard |
| Mobile | 9845000000-9845999999 | 456321 | Vodafone-Visa |
| Mobile | 9844000000-9844999999 | — | SingTelHost |

The table illustrates an example of switching criteria for credit card and mobile payment types. For routes that have one or more blank fields, the fields simply would not be considered by the switch in routing transaction to the appropriate host.

Prior art switches are not capable of handling composite transactions. Composite transactions refer to multi-host, singular transaction received from an end-consumer. Hence, a composite transaction is split into multiple transaction packets for transmission to respective financial institutions for processing and involves changes in payment and transaction type. For example, a recharge transaction of a mobile phone pre-paid card is a composite transaction. The recharge transaction is first assumes a payment type of "debit" or "credit", and a transaction type of "sale". It is first routed to a clearing house or bank for approval. Once the request for funds is approved, the transaction assumes a transaction type of "charge" and is transmitted to the Mobile Service Provider to replenish the customer's pre-paid card with the approved amount. Another example of a composite transaction is payment of credit card bills by deducting from bank accounts.

A multi-host transaction is a transaction that has to be routed to multiple hosts, but does not necessarily have to be a composite transaction. An example of a multi-host transaction is a credit card sale transaction. The transaction is first sent to an appropriate bank host for approval and thereafter sent to the mobile service provider of a customer to inform the customer of completion of transaction.

According to yet another embodiment, the transaction switch 202 is configured to handle composite transactions. To process a composite transaction, the transaction is split into several packets based on its payment and transaction type. A table is preferably predefined by the acquirer for determining how a composite transaction may be split. An example is illustrated as follows:

| Payment Type | Composite Transaction | Split Transaction | Split Payment Type |
|---|---|---|---|
| Mobile | Recharge mobile pre-paid card | Sale | Credit |

Using the above example, the composite transaction is a request to recharge a pre-paid card of a customer. The transaction assumes a transaction type of "sale" and a payment of "credit", as customer chose credit card as mode of payment.

After determining payment and transaction type, the switch 202 determines which financial institutions or hosts to transmit to based on a routing table. Such a routing table containing the switching criterion is illustrated below, where BIN and Merchant ID forms the criteria for identifying a host for the transaction.

| Payment Type | BIN | Merchant ID | Host |
| --- | --- | --- | --- |
| Credit | 400000-499999 | 123789 | VISA |
| Credit | 500000-599999 | 123789 | MasterCard |

From the routing table, the transaction assumes a payment type of "credit" and is evaluated on its BIN and Merchant ID to identify the host or financial institution for processing the transaction. Based on the routing table, the transaction switch 202 transmits a first transaction packet to the identified host. When the first transaction packet is processed and the request for funds approved, a "charge" transaction now proceeds to replenish a certain amount to the customer's pre-paid card. To this end, the transaction assumes a transaction type of "charge" and a second transaction packet is transmitted to a second identified host (mobile service provider) to recharge the pre-paid card. The transactions sent to each host for processing and the corresponding response code are recorded in the transaction log. A final response is determined by the switch 202 from the various response codes received from each host, indicating the status of the composite transaction. The final response is then interpreted and transmitted to the merchant and/or customer.

An example of a response code based routing table is illustrated below for the mobile prepaid card recharge example. Such a table is primarily for transforming payment and transaction type before the transaction is further routed to additional hosts.

action to the switch. "Out_Pymt_Type" refers to the payment type of an outbound transaction packet. The transaction would be received by the host specified in "To-Host" and the payment type would be changed by the switch module before forwarding the transaction to a next host. "Out-Txn_Type" refers to the transaction type of the outbound transaction packet. The transaction would be received by the host specified in "To_Host" and the transaction type would be changed by the switch module before forwarding the transaction.

Composite transactions offer end-consumers the convenience of converging multiple payment transactions. Prior to the present invention, handling composite transactions is possible only with heavy customization to establish communication links between a particular service provider and a host for accepting transactions from end customers.

During processing of transactions, unfavourable situations may arise, such as, a credit card user having insufficient credit balance to recharge his pre-paid card. Hence, the dynamic handling of transactions is provided by first determining the response code from a previous host and then determining a next host for accepting a particular payment and transaction type. To this end, another table is provided in the transaction switch 202 to route the transaction to the appropriate host with the correct payment and transaction type based on the response codes. Such a table would be configured by the acquirer to suit business requirements.

Figure 3:
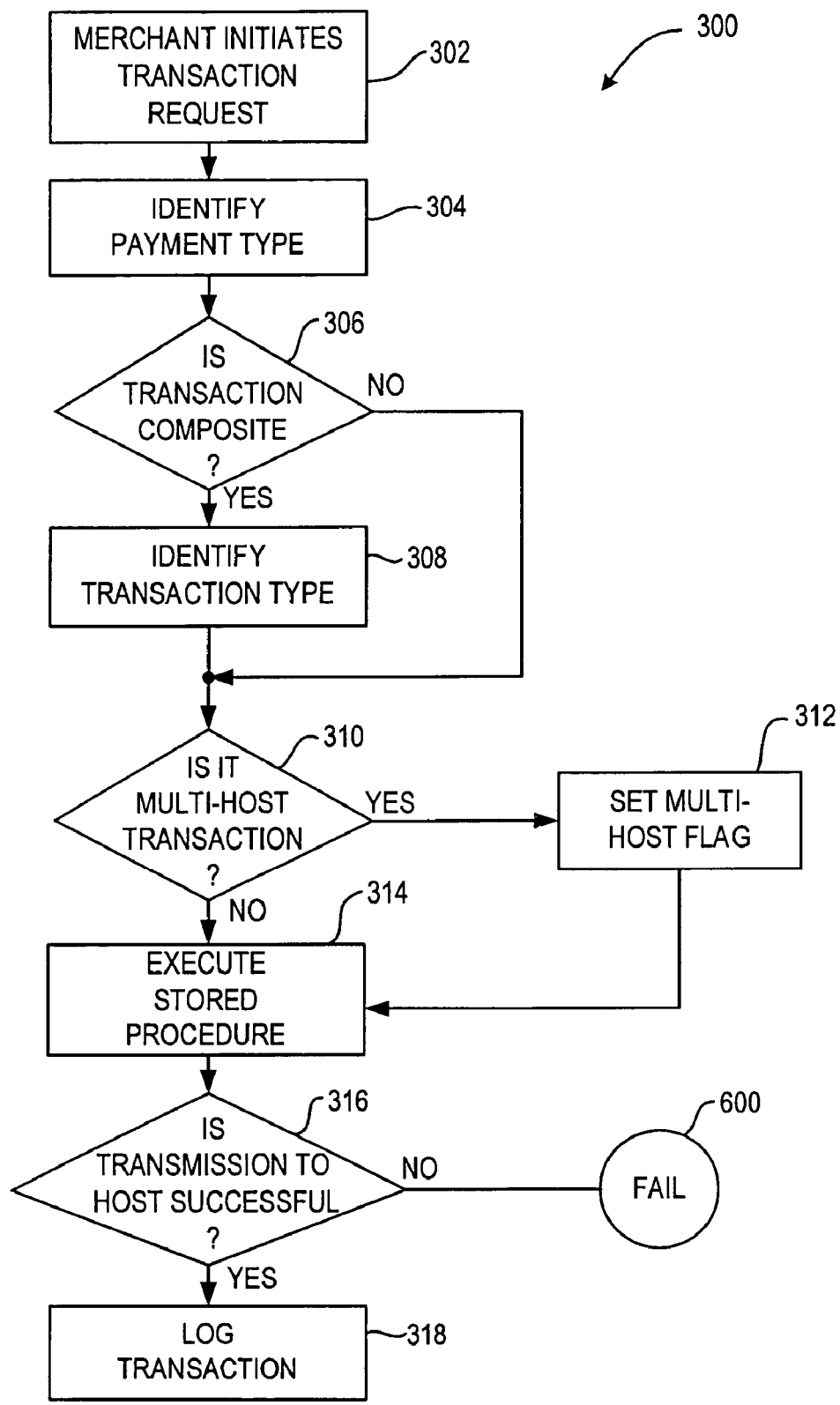
FIG. 3 is a flow diagram for handling a primary transaction request in accordance with an embodiment of the present invention.

Detailed operation sequence of transactions between the merchants and financial institutions or hosts is now described with reference to flow diagrams in FIGS. 3, 4, 5, and 6. FIG. 3 illustrates a flow sequence 300 of a primary request transaction. The sequence 300 starts with a merchant initiating and transmitting a transaction request to a transaction switch with an acquirer in a MERCHANT INITIATES TRANSACTION REQUEST step 302. The switch identifies the payment type from the transaction request in an IDENTIFY PAYMENT TYPE step 304. The switch then checks whether transaction is a composite transaction in an IS TRANSACTION COMPOSITE? decision step 306. If the transaction is composite, the switch identifies the transaction type of the composite transaction in an IDENTIFY TRANSACTION TYPE step

| In_Pymt_Type | Identifier | From_Host | In_Txn_Type | Resp_Code | To_Host | Out_Pymt_Type | Out_Txn_Type |
| --- | --- | --- | --- | --- | --- | --- | --- |
| Credit | Vodafone | VisaTerm | Sale | Success | VodaTerm | Mobile | Recharge |
| Credit | Vodafone | VisaTerm | Sale | Fail | Respond | Mobile_Recharge | Mobile_Recharge |
| Mobile | Vodafone | VodaTerm | Mobile | Success | Respond | Mobile_Recharge | Mobile_Recharge |

In the above table, "In_Pymt_Type" refers to the payment type of an inbound transaction packet received by the transaction switch; "Identifier" are tags assigned by an acquirer to transactions that have the same rule; "From_Host" refers to the most recent host which processed the transaction prior to it being received by the switch; "In_Txn_Type" refers to the transaction type of the inbound transaction packet. "Resp_Code" refers to the outcome of processing the transaction packet by the most recent host specified in "From-Host". Values for "Resp_Code" include "Success" and "Fail", where reasons for "Fail" value may include failed processing and failed transmission.

"To_Host" refers to a prospective host for receiving and processing the transaction. When the value of "To_Host" reads "Respond", the switch 202 sends the transaction to the original Point-of-Sale terminal or the host that sent the trans- 308. The transaction switch further checks whether the transaction is a multi-host transaction in a MULTI-HOST TRANSACTION? decision step 310. If the transaction is multi-host, the sequence 300 proceeds to a SET MULTI-HOST FLAG step 312.

The sequence 300 then proceeds to an EXECUTE STORED PROCEDURE step 314. The stored procedure is defined by the acquirer and contains steps for identifying the host(s) for receiving the transaction from predefined routing tables. When the host(s) are identified, the switch sends the transaction request to the identified host. If the transaction is a composite transaction, the transaction is split into multiple transaction packets and transmitted to respective hosts.

Transmission status is ascertained in an IS TRANSMISSION TO HOST SUCCESSFUL? decision step 316. If transmission of transaction request fails, proceed to a Failure State Sequence 600 (described later). If transaction is successfully transmitted, the transaction is logged in a LOG TRANSACTION step 318.

Figure 4:
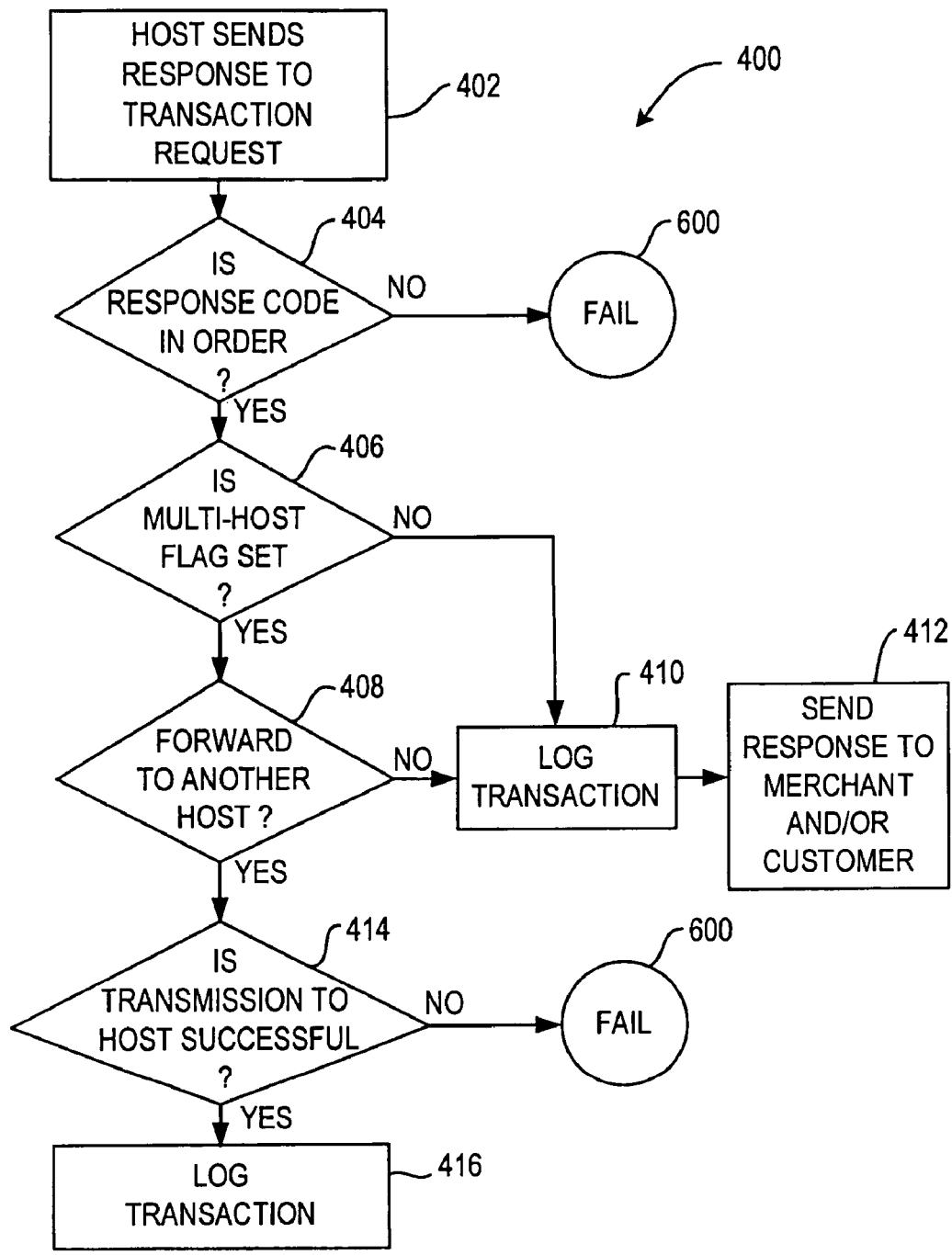
FIG. 4 is a flow diagram for handling a primary transaction response in accordance with an embodiment of the present invention.

FIG. 4 illustrates a flow sequence 400 of a primary response transaction. The sequence 400 begins when a host processes a transaction request and responds to the switch with the outcome of processing to the switch 202 in a HOST SENDS RESPONSE TO TRANSACTION REQUEST step 402. The switch 202 receives and ascertains the response code in an IS RESPONSE CODE IN ORDER? step 404. If the response code indicates that transaction is unsuccessful, the sequence proceeds to a Failure State Sequence 600 (described later). If the transaction is approved by the host, the switch 202 proceeds to check whether multi-host flag is set in an IS MULTI-HOST FLAG SET? decision step 406. If the multi-host flag is not set, the transaction is logged in a LOG TRANSACTION step 410 and the response code is sent to the merchant in a SEND RESPONSE TO MERCHANT step 412.

If the multi-host is set, the stored procedure checks the routing table to identify the next host for receiving the transaction, in a FORWARD TO ANOTHER HOST? Decision step 408. If routing table indicates "return to merchant", the transaction is logged in the LOG TRANSACTION step 410 and the response code is transmitted to the merchant in a SEND RESPONSE TO MERCHANT step 412. If routing table indicates "forward to host", the transaction is forwarded to a second host. If transmission to second host is successful (step 414), the transaction is logged in a LOG TRANSACTION step 416. If not, the sequence proceeds to the Fail State Sequence 600 (described later).

Figure 5:
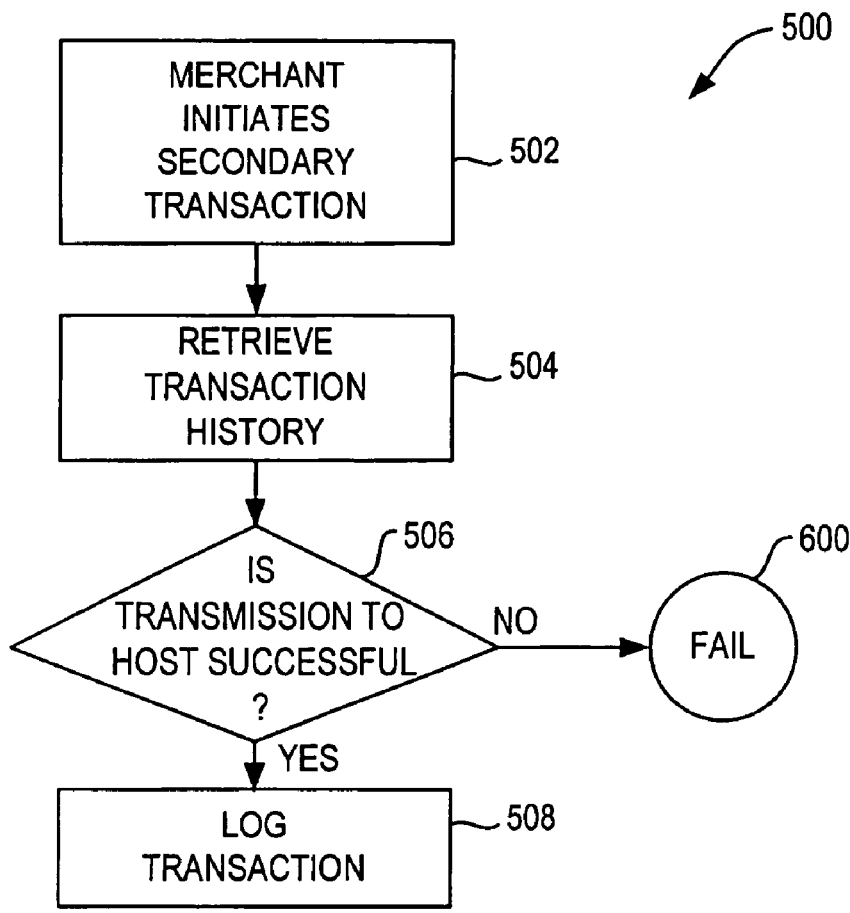
FIG. 5 is a flow diagram for handling a secondary transaction in accordance with an embodiment of the present invention.

FIG. 5 illustrates a flow sequence 500 of a secondary transaction, such as a refund transaction. The sequence 500 begins when a merchant initiates a refund (secondary) transaction request and transmits to the acquirer in a MERCHANT INITIATES SECONDARY TRANSACTION step 502. With the unique identifiers assigned to each transmission of transactions, transaction history is retrieved in a RETRIEVE TRANSACTION HISTORY step 504. The financial institutions or hosts that approved or processed the primary transaction is identified from the history. Thereafter, the switch 202 transmits a refund request to the hosts for processing. The sequence 500 ascertains whether transmission of the refund request is successful in an IS TRANSMISSION TO HOST SUCCESSFUL? decision step 506. If the transmission of refund request is unsuccessful, the sequence 500 proceeds to a Failure State sequence 600. If the transmission is successful, the refund request is logged in a LOG TRANSACTION step 508.

Figure 6:
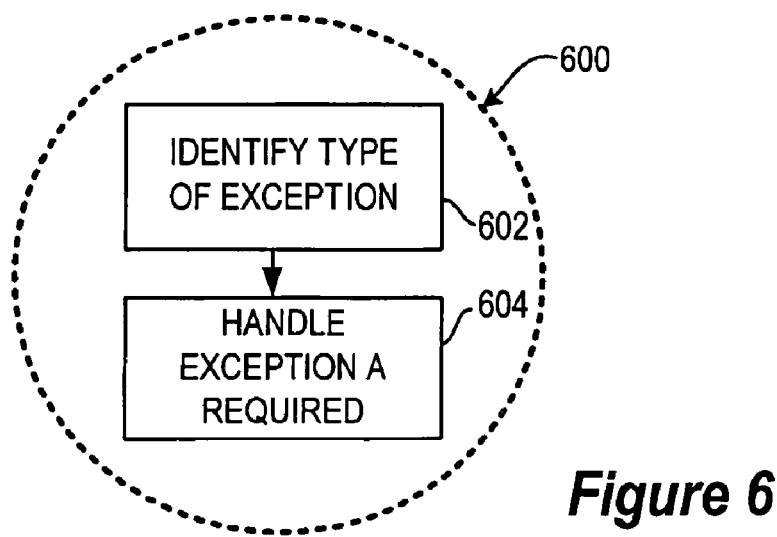
FIG. 6 is a flow diagram for handling a failure state in accordance with an embodiment of the present invention.

FIG. 6 illustrates a flow sequence 600 of a failure state. The failure state may be encountered in certain situations as described above. The Failure State sequence 600 begins with identifying the cause of failure in an IDENTIFY TYPE OF EXCEPTION step 602. Causes of failure include network congestion, host unavailability, timeout, etc. When the cause has been identified, the failure state is handled as required in a HANDLE EXCEPTION AS REQUIRED step 604. An illustration of how a failure state may be handled is as follows. For a sales transaction which has to be communicated to five hosts and the fourth host is unavailable, a request to cancel the original sale and inform the merchant of the failure is transmitted to the first three hosts.

The above-described embodiments may also be implemented, for example, by operating a computer system to execute a sequence of machine-readable instructions. The instructions may reside in various types of computer readable media. In this respect, another aspect of the present invention concerns a programmed product, comprising computer readable media tangibly embodying a program of machine-readable instructions executable by a digital data processor to perform the method in accordance with an embodiment of the present invention.

This computer readable media may comprise, for example, RAM contained within the system. Alternatively, the instructions may be contained in another computer readable media and directly or indirectly accessed by the computer system. Whether contained in the computer system or elsewhere, the instructions may be stored on a variety of machine readable storage media, such as a Direct Access Storage Device (DASD) (e.g., a conventional "hard drive" or a RAID array), magnetic data storage diskette, magnetic tape, electronic non-volatile memory, an optical storage device (for example, CD ROM, WORM, DVD,), or other suitable computer readable media including transmission media such as digital, analog, and wireless communication links. In an illustrative embodiment of the invention, the machine-readable instructions may comprise lines of compiled C, C++, or similar language code commonly used by those skilled in the programming for this type of application arts.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method of handling a financial transaction in a transaction switch, the method comprising the steps of:
   receiving a primary transaction request from an initiator;
   identifying a host from a routing table for receiving the primary transaction request based on details provided in the primary transaction request;
   transmitting the primary transaction request to the identified host;
   receiving a response from the identified host,
   determining a need for transmitting the primary transaction request to another host;
   interpreting the response received and transmitting a final outcome back to the initiator;
   recording each transmission between the initiator, the transaction switch and the host and assigning a unique identifier to each transmission;
   receiving a secondary transaction containing a reference to the primary transaction request;
   retrieving a transaction history using the unique identifier; and
   transmitting a request to a host contained in the transaction history for reversing the primary transaction.

2. The method according to claim 1, wherein the step of receiving the primary transaction request comprises the step of receiving the primary transaction request in an XML format.

3. The method of claim 1, wherein the determining a need for transmitting the primary transaction request to another host comprises:
   determining the need for transmitting the primary transaction request to the another host based on at least one of a payment type in the primary transaction request, a transaction type in the primary transaction request and a response code in the response received from the identified host.

4. A method of handling a composite financial transaction in a transaction switch, the steps comprising:
- receiving a primary transaction request from an initiator;
- identifying the transaction as a composite transaction wherein the composite transaction comprises a transaction type and a payment type;
- preparing a plurality of transaction packets for transmission to a plurality of hosts based on the transaction type and the payment type;
- receiving a plurality of responses at the switch from the plurality of hosts,
- interpreting the plurality of responses and transmitting a final outcome to the initiator;
- determining from the plurality of responses a need for transmitting the request to another host;
- recording each transmission between the initiator, the transaction switch and the plurality of hosts and assigning a unique identifier to each transmission;
- receiving a secondary transaction containing a reference to the primary transaction request;
- retrieving a transaction history using the unique identifier; and
- transmitting a request to hosts contained in the transaction history for reversing the primary transaction.

5. The method according to claim 4, wherein the step of receiving the primary transaction request comprises the step of receiving the primary transaction request in an XML format.

6. A transaction switch comprising:
- means for processing a transaction request;
- means for identifying the transaction as multi-host, wherein a multi-host transaction is a transaction that has to be routed to multiple hosts;
- means for identifying the transaction as composite, wherein a composite transaction comprises a plurality of transactions, each to be transmitted to a different host, and the plurality of transactions have different payment types and transaction types;
- means for identifying the transaction as both multi-host and composite;
- means for identifying a first host for processing the transaction; and
- means for interpreting a response from the host after processing the transaction and determining a need for further processing.

7. The switch according to claim 6, wherein the means for interpreting a response further includes means for identifying a second host for processing the transaction.

8. The switch according to claim 6 further includes means for preparing a plurality of transaction packets for a transaction identified as composite and identifying the payment and transaction types for each of the plurality of transaction packets.

9. A financial transaction handling system comprising:
- an initiator for initiating a primary transaction request;
- a transaction switch in communication with the initiator; and
- at least one host in communication with the transaction switch for processing the transaction request;
- wherein the transaction switch comprises:
- means for processing the primary transaction request;
- means for identifying the primary transaction request as multi-host, wherein a multi-host transaction is a transaction that has to be routed to multiple hosts;
- means for identifying the transaction as composite, wherein a composite transaction comprises a plurality of transactions, each to be transmitted to a different host, and the plurality of transactions have different payment types and transaction types;
- means for identifying the transaction as both multi-host and composite;
- means for identifying the at least one host for sending the primary transaction request thereto; and
- means for interpreting a response from the at least one host and determining a need for further processing.

10. The system according to claim 9, wherein the primary transaction request is in an XML format.

11. The system according to claim 9, wherein the means for identifying the at least one host comprises means for identifying the at least one host from a routing table based on details provided in the primary transaction request.

12. The system according to claim 9, wherein the transaction switch further comprises means for recording each transmission between the initiator, the transaction switch and the at least one host and assigning a unique identifier to each transmission.

13. The system according to claim 12, wherein the transaction switch further comprising:
- means for processing a secondary transaction request from the initiator, the secondary transaction request containing a reference to the primary transaction request;
- means for retrieving a transaction history using the unique identifier; and
- means for transmitting a request to the least one host contained in the transaction history for reversing the primary transaction.

14. A program storage medium readable by a computer, tangibly embodying a program of instructions executable by the computer to perform method steps for handling a financial transaction in a transaction switch, the method steps comprising the steps of
- receiving a primary transaction request from an initiator;
- identifying a host from a routing table for receiving the primary transaction request based on details provided in the primary transaction request;
- transmitting the primary transaction request to the identified host;
- receiving a response from the identified host;
- determining a need for transmitting the primary transaction request to another host;
- interpreting the response received and transmitting a final outcome back to the initiator;
- recording each transmission between the initiator, the transaction switch and the host and assigning a unique identifier to each transmission;
- receiving a secondary transaction containing a reference to the primary transaction request;
- retrieving a transaction history using the unique identifier; and
- transmitting a request to a host contained in the transaction history for reversing the primary transaction.

\* \* \* \* \*

UNITED STATES PATENT AND TRADEMARK OFFICE
CERTIFICATE OF CORRECTION

| | | |
|---|---|---|
| PATENT NO. | : 7,761,375 B2 | Page 1 of 1 |
| APPLICATION NO. | : 10/802163 | |
| DATED | : July 20, 2010 | |
| INVENTOR(S) | : Ramanathan Kasiviswanathan et al. | |

It is certified that error appears in the above-identified patent and that said Letters Patent is hereby corrected as shown below:

On the face page, in field (54), Title, in column 1, line 2, delete "FOR" and insert -- OF --, therefor.

In column 1, line 2, delete "FOR" and insert -- OF --, therefor.

In column 10, line 40, in Claim 14, delete "of" and insert -- of: --, therefor.

Signed and Sealed this

Second Day of November, 2010

David J. Kappos
*Director of the United States Patent and Trademark Office*